UNITED STATES PATENT OFFICE 2,252,828

SECONDARY XENOXY-ALKYL-AMINES

Francis N. Alquist and Harold R. Slagh, Midland, Mich., assignors to The Dow Chemical Company, Midland, Mich., a corporation of Michigan No Drawing. Application April 19, 1939,
Serial No. 268,824

9 Claims. (Cl. 260—571)

This invention concerns certain secondary amines having the formula

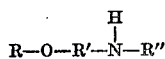

wherein R represents a xenyl radical, R' represents a lower alkylene group, and R'' represents an oxygen-containing radical such as hydroxy-aryl, hydroxy-alkyl, alkoxy-aryl, alkoxy-alkyl, aryloxy-aryl, aryloxy-alkyl, and furfuryl radicals and wherein all substituted aryl groups, as designated by R'', are members of the benzene series, and the hydrochlorides thereof.

Our new secondary amines can be prepared by heating a mixture of a xenoxy-alkyl halide and a suitable primary amine to reaction temperature and thereafter separating out the desired secondary amine compound. We generally employ an appreciable excess of the primary amine in order that the major product of reaction can be the secondary amine compound. The reaction is carried out in the liquid phase under atmospheric pressure or in a high pressure reaction under autogenous pressure, stirring being maintained throughout the process until the condensation is complete. The preferred temperature is dependent upon the particular reactants employed and is usually between about 125° C. and the decomposition temperature of the reaction mixture, although somewhat lower temperatures will sometimes accomplish the condensation. On completion of the heating step, the reaction mixture may be washed with aqueous alkali or otherwise neutralized to liberate the free amine compound. While the crude product so obtained has been found of value as an acid inhibitor, such mixture may be fractionally distilled under reduced pressure to obtain the desired secondary amines in desired form. These compounds are for the most part high-boiling oils difficultly soluble in water, somewhat soluble in most organic solvents and having a characteristic amine odor. The resinous tars obtained as distillation residues following the recovery of the secondary amines consist of a mixture of tertiary amine products which decompose upon attempted distillation.

The hydrochlorides of the secondary amine compounds obtained as described above may be readily prepared by dissolving secondary amine in a suitable organic solvent, e. g. benzene, petroleum ether, and the like, and thereafter bubbling dry hydrogen chloride through the solution to precipitate the desired amine salts. These hydrochlorides are generally solid, crystalline compounds, readily separable from such solvent suspension by filtration.

If desired, the condensation may be carried out in the presence of an inert organic solvent such as xylene, toluene, and the like. Also, a small amount of copper or potassium iodide catalyst may be included in the reaction mixture to accelerate the speed of reaction, although this is not required. Similarly, inorganic alkalies, such as sodium carbonate, calcium oxide, etc., may be employed to expedite the condensation.

The expressions "xenyl," "xenoxy," and "xenol," as herein employed, refer to diphenyl and phenylphenoxy radicals and to the phenylphenols, respectively, and include such radicals and compounds wherein the benzene nuclei may be substituted by alkyl or halogen. The term "primary amine" refers to any hydroxy-alkyl, hydroxy-aryl, alkoxy-alkyl, aryloxy-alkyl, alkoxy-aryl, aryloxy-aryl, amine or furfuryl amine.

The xenoxy-alkyl halides employed as reactants in the preparation of our new secondary amines and their hydrohalides may be prepared by the reaction of an alkylene dihalide with an alkali metal xenolate, e. g. sodium-orthophenyl-phenolate. The xenoxy-alkyl halides are all high-boiling compounds and vary in character-istic from viscous oils to high-melting solids.

The following examples describe in detail several adaptations of our invention, but are not to be construed as limiting the same:

Example 1

116 grams (0.5 mol) of beta-2-xenoxy-ethyl chloride and 120 grams (1.1 mol) of 2-amino-phenol were dissolved in 150 milliliters of xylene and the solution refluxed at 146°–157° C. for 40 hours. 220 grams of a 10 per cent aqueous sodium hydroxide solution was then shaken with the reacted mixture and the xylene layer separated. Upon distillation of the xylene solution, there was obtained 71 grams of beta-2-xenoxy-ethyl)(2-hydroxy-phenyl) amine as a thick, straw-colored sirup boiling between 210° and 224° C. at 0.2 inch pressure. This compound is soluble in alcohol and benzene and has the formula

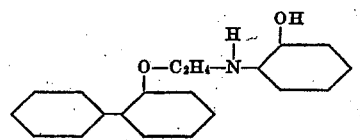

Example 2

116 grams (0.5 mol) of beta-2-xenoxy-ethyl chloride and 128 grams (2 mols) of mono-ethanol amine (95 per cent) were mixed together and heated at temperatures gradually increasing from 190° to 205° C. for 16.5 hours. The crude reaction product was then cooled to room temperature and neutralized with an excess of aqueous sodium hydroxide. The alkaline mixture was extracted with benzene and the benzene extract fractionally distilled, whereby there was obtained 84 grams of (beta-2-xenoxy-ethyl) (beta-hydroxy-ethyl) amine having the formula

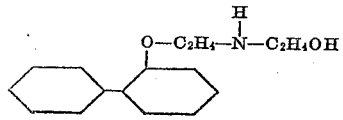

This compound is a straw-colored oil boiling at 220° to 227° C. at 0.1 inch pressure and tending to crystallize out upon long standing.

A portion of this product was dissolved in benzene and reacted with an excess of dry hydrogen chloride, whereby a white, crystalline precipitate was formed. This product was filtered out of the benzene medium and washed with petroleum ether to obtain (beta-2-xenoxy-ethyl) (beta-hydroxy-ethyl) amine hydrochloride as a white, crystalline product melting at 149.5° C.

In a similar manner, other xenoxy-alkyl halides, such as the bromides and iodides, may be reacted with primary amines to form secondary amine compounds falling within the scope of this invention. Representative of the xenoxy-alkyl halides which may be so reacted are beta-3-xenoxy-ethyl chloride boiling at 179° to 181° C. at 5 millimeters pressure; beta-2-xenoxy-normal-propyl chloride having a specific gravity of 1.141 at 20°/4° C. and boiling at 147° to 149° C. at 3 millimeters pressure; beta-2-xenoxy-ethyl bromide, a white, crystalline solid melting at 166.5° C. and boiling at 170° to 175° C. at 5 millimeters pressure; beta-4-xenoxy-ethyl chloride, a crystalline compound melting at 130° C. and boiling at 163° to 165° C. at 3 millimeters pressure; (beta-methyl) (gamma-2-xenoxy)-n-propyl chloride, an oil boiling at 170° to 173° C. at 5 millimeters pressure; beta-2-(5-chloro-xenoxy)-ethyl chloride, a viscous oil boiling at 149°–150° C. at 3 millimeters pressure; 1 beta-2-(5-isopropyl-xenoxy)-ethyl chloride, an oil boiling at 150° to 153° C. at 2 millimeters pressure, and having a specific gravity of 1.093 at 20° C.; etc. Other similar compounds which may be employed are omega-2-xenoxy-n-amyl chloride, gamma-2-bromo-xenoxy-propyl bromide, beta-2-(5-tertiary-butyl-xenoxy)-ethyl chloride, beta-2-xenoxy-ethyl iodide, beta-4-(2,6-dimethyl-xenoxy)-ethyl chloride, and the like. Among other oxygen-containing amines which may be reacted with such xenoxy-alkyl halides are: furfuryl amine, 2-cyclohexyl-4-amino-phenol, 4-methyl-2-amino-phenol, 3-amino-phenol, 2-hydroxy-propyl amine, 4-hydroxy-butyl amine, ethoxy-ethyl amine, propoxy-propyl amine, butoxy-ethyl amine, phenoxy-ethyl amine, 4-tertiary-butyl-phenoxy-ethyl amine, 4-methoxy-phenyl amine, 2-butoxy-phenyl amine, 4-phenoxy-phenyl amine, and the like. The hydrochlorides of the secondary amines obtained by the reaction of the above xenoxy-alkyl halides and primary amines may be readily prepared substantially as described in the foregoing examples.

Small amounts of the foregoing secondary amines may be added to aqueous acid solutions as corrosion inhibitors. For example, a 1 per cent solution of (beta-2-xenoxy-ethyl) (2-hydroxy-phenyl) amine in 6 per cent hydrochloric acid was prepared. Weighed iron strips of 6.75 square inches surface area were suspended in this solution and also in a control solution of 6 per cent hydrochloric acid to determine the inhibiting effect of the amine. After 16 hours at room temperature, the test specimens suspended in the control solution were found to have lost an average of 6.66 grams in weight, respectively. Similar test specimens suspended in the hydrochloric acid-amine solution showed an average weight loss of 0.86 gram after 16 hours. The presence of the amine fraction in the aqueous acid solution resulted, therefore, in a reduction in excess of 87 per cent of the total weight lost by corrosion. In a similar test, a 1 per cent mixture of (beta-2-xenoxy-ethyl) (beta-hydroxy-ethyl) amine and hydrochloric acid gave a comparable reduction in the amount of iron dissolved by the treating acid.

The present application is a continuation-in-part of our co-pending application Serial No. 221,605, filed July 27, 1938.

We claim:

1. A compound selected from the group consisting of (1) secondary amines having the formula

wherein R represents a xenyl radical, R' represents a lower alkylene group, and R" represents an oxygen-containing organic residue selected from the group consisting of hydroxy-aryl, hydroxy-alkyl, alkoxy-aryl, alkoxy-alkyl, aryloxy-aryl, aryloxy-alkyl, and furfuryl radicals and wherein all substituted aryl groups, as designated by R", are members of the benzene series, and (2) the hydrochlorides thereof.

2. A secondary amine having the formula

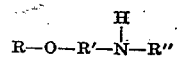

wherein R represents a xenyl radical, R' represents a lower alkylene group, and R" represents an oxygen-containing organic residue selected from the group consisting of hydroxy-aryl, hydroxy-alkyl, alkoxy-aryl, alkoxy-alkyl, aryloxy-aryl, aryloxy-alkyl, and furfuryl radicals and wherein all substituted aryl groups, as designated by R", are members of the benzene series.

3. An amine hydrochloride having the formula

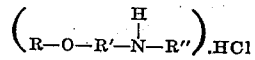

wherein R represents a xenyl radical, R' represents a lower alkylene group, and R" represents an oxygen-containing organic residue selected from the group consising of hydroxy-aryl, hydroxy-alkyl, alkoxy-aryl, alkoxy-alkyl, aryloxy-aryl, aryloxy-alkyl, and furfuryl radicals and wherein all substituted aryl groups, as designated by R", are members of the benzene series.

4. A secondary amine having the formula

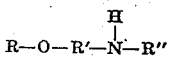

wherein R represents a xenyl radical, R' represents a lower alkylene group, and R" represents a hydroxy-aryl radical of the benzene series.

5. A secondary amine having the formula

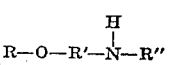

wherein R represents a xenyl radical, R' represents a lower alkylene group, and R" represents a hydroxy-alkyl radical.

6. A secondary amine having the formula

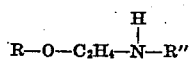

wherein R represents a xenyl radical, and R" represents an oxygen-containing organic residue selected from the group consisting of hydroxy-aryl, hydroxy-alkyl, alkoxy-aryl, alkoxy-alkyl, aryloxy-aryl, aryloxy-alkyl, and furfuryl radicals and wherein all substituted aryl groups, as designated by R", are members of the benzene series.

7. A secondary amine having the formula

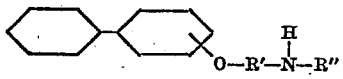

wherein R' represents a lower alkylene group, and R" represents an oxygen-containing organic residue selected from the group consisting of hydroxy-aryl, hydroxy-alkyl, alkoxy-aryl, alkoxy-alkyl, aryloxy-aryl, aryloxy-alkyl, and furfuryl radicals and wherein all substituted aryl groups, as designated by R", are members of the benzene series.

8. (Beta-2-xenoxy-ethyl) (2-hydroxy-phenyl) amine.

9. (Beta-2-xenoxy-ethyl) (beta-hydroxy-ethyl) amine.

FRANCIS N. ALQUIST.
HAROLD R. SLAGH.